C. R. DODSWORTH.
TABLE LEG FASTENER.
APPLICATION FILED OCT. 5, 1921.
1,426,848.
Patented Aug. 22, 1922.
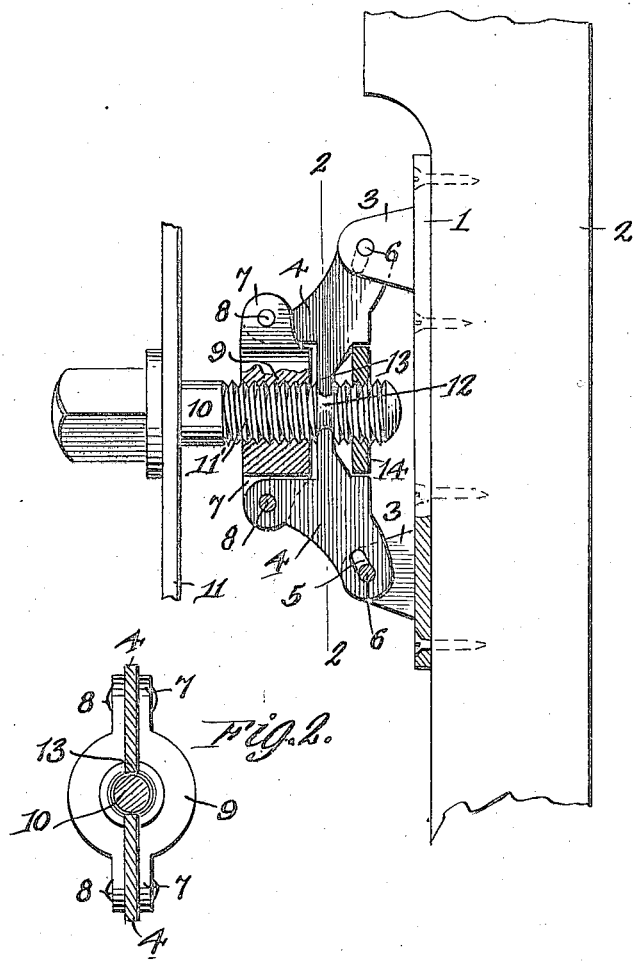

UNITED STATES PATENT OFFICE.

CHARLES R. DODSWORTH, OF GRAND RAPIDS, MICHIGAN.

TABLE-LEG FASTENER.

1,426,843.  Specification of Letters Patent.  Patented Aug. 22, 1922.

Application filed October 5, 1921. Serial No. 505,553.

*To all whom it may concern:*

Be it known that I, CHARLES R. DODSWORTH, a subject of the King of Great Britain, residing at Grand Rapids, in the county of Kent and State of Michigan, have invented certain new and useful improvements in a Table-Leg Fastener, of which the following is a specification:

This invention relates to a table-leg fastener and has for its principal object to provide a device of this nature which will be of extremely simple, durable and inexpensive construction, one which is efficient and reliable in operation, and well adapted to the purpose for which it is designed.

Another important object of the invention is to provide a device of this nature which will rigidly brace the leg to the usual corner brace found on tables and prevent it from becoming loose when the table is moved from place to place as is now common with the usual fasteners in use.

A still further object of the invention is to provide a fastening device having a locking mechanism in connection therewith which will prevent the fastener from becoming accidentally loosened after once having been placed in connection with the leg and the table.

With these and numerous other objects in view, the invention consists in certain novel features of construction, and the combination and arrangement of parts as will be hereinafter fully described and claimed.

In the drawing:—

Figure 1 is an elevation of the fastener, portions being shown in section, showing the same attached to a corner brace and a table leg, and Figure 2 is a transverse section taken on the line 2—2 of Figure 1 looking to the left.

Referring to the invention in detail it will be seen that the same consists of a plate 1 which is securedly attached to the table leg 2 intermediate its ends preferably adjacent the upper end thereof and is provided with a spaced pair of ears 3. Pivotally mounted between each pair of the ears 3 there is situated an arm 4 which is provided at one end with a slot 5 for receiving the pivot pin 6. The other end of each arm 4 is pivoted between the ears 7 by a pin 8 and these ears 7 are mounted on the block 9 which is provided with a threaded bore. The bolt 10 extending through the corner brace 11 is provided with the usual threaded portion 11' having a groove 12 disposed intermediate its ends. This threaded portion is passed through the threaded bore of the block 9 so that its groove 12 is situated slightly beyond one end thereof and is adapted to receive the fingers 13 projecting from the arms 4 and thus locking the fastener by preventing further rotation of the bolt 10. An additional precaution is provided in the lock nut 14 disposed on the end threads of the bolt 10.

In assembling this fastener the plate 1 is attached to the table leg 2 by screws or in any other suitable manner and carries the arms 4 and block 9. The bolt 10 is left out entirely until the assembling of the table. To complete assembling this fastener and bring all the parts in relation to the leg 2 and the corner brace 11, the block 9 is pushed back toward the plate with the result that the pins 6 are positioned at the inner ends of the slots 5 in the arms 4. The bolt is now ready to be inserted into the block 9 by rotation thereof and it will be seen that at this time the fingers 13 will be out of engagement with the threaded portion of the bolt. When the head of the bolt comes in contact with the brace 11 the fingers will still be out of engagement with the groove 12 in the bolt 10. Before the fastener is locked the table leg 2 is snug against the ends of the table rail. The head of the bolt 10 is flush with the corner brace 11 but the pins 6 are still in the inner ends of the slots 5. Two or three turns of the bolt with a wrench are now made which gradually draws the fingers 13 into the groove 12 which is situated near the end of the bolt 10. This extra tightening of the bolt locks the fastener and prevent rotation of the bolt 10 so as to bring all parts including the fastener, legs 2, and the corner brace 11 into a rigid position thereby distributing the strength and holding power over the entire corner of the table.

Having thus described my invention, what I claim as new is:

1. In combination, a plate, a pair of arms pivoted to the plate, a block having a threaded bore, means for pivotally attaching the block to the ends of the arms, a bolt adapted to be received in threaded engagement with the block, said bolt provided with a groove in its threaded portions intermediate its ends, and fingers projecting from the arms for engagement in the groove so as to hold the bolt locked against rotation.

2. In combination, a plate, a pair of arms having slots in one end, pins on the plate for engaging the slots for pivotally mounting the arms, a block having a threaded bore, said arms being in pivotal engagement with said block, a bolt adapted to threadedly engage said block and provided with a groove intermediate its ends, and fingers projecting from the arms for engaging the groove so as to lock the bolt against rotation.

3. In combination, a leg, a brace, a plate fixed on the leg, a bolt passing through the brace, a block for threadedly receiving the bolt, arms pivoted at one end to the plate and at their other ends to the block, and means on the arm for engaging the bolt so as to lock the same against movement in the manner and for the purpose specified.

In testimony whereof I affix my signature in presence of two witnesses.

CHARLES R. DODSWORTH.

Witnesses:
JEANETTE BUTTERWORTH,
FRANK S. WHALER.